United States Patent [19]

Ahroni

[11] 4,025,779
[45] May 24, 1977

[54] OPTIC FIBER DECORATIVE DEVICE

[76] Inventor: Joseph M. Ahroni, Pier 39, Room 201, Seattle, Wash. 98134

[22] Filed: Apr. 28, 1975

[21] Appl. No.: 572,141

[52] U.S. Cl. .......................... 240/10 L; 240/1 LP; 240/47

[51] Int. Cl.² ........................................ F21V 29/00

[58] Field of Search ............. 240/1 LP, 10 L, 10 P, 240/10 R, 47

[56] References Cited
UNITED STATES PATENTS 3,532,874 10/1970 Rosemast ......................... 240/10 L
3,564,231 2/1971 Bruce et al. ...................... 240/1 LP
3,638,013 1/1972 Keller ............................... 240/1 LP
3,775,606 11/1973 Bazell et al. ..................... 240/1 LP Primary Examiner—Russell E. Adams, Jr.
Attorney, Agent, or Firm—Seed, Berry, Vernon & Baynham

[57] ABSTRACT

A spray of optic fibers is plugged into the top of a housing having an electric light assembly and provision for ventilation. Transparent heat shields are provided to assist the ventilation in preventing overheating of the light-receiving ends of the optic fibers.

9 Claims, 4 Drawing Figures

U.S. Patent   May 24, 1977   4,025,779
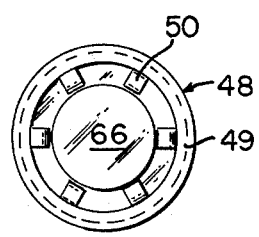
FIG. 1
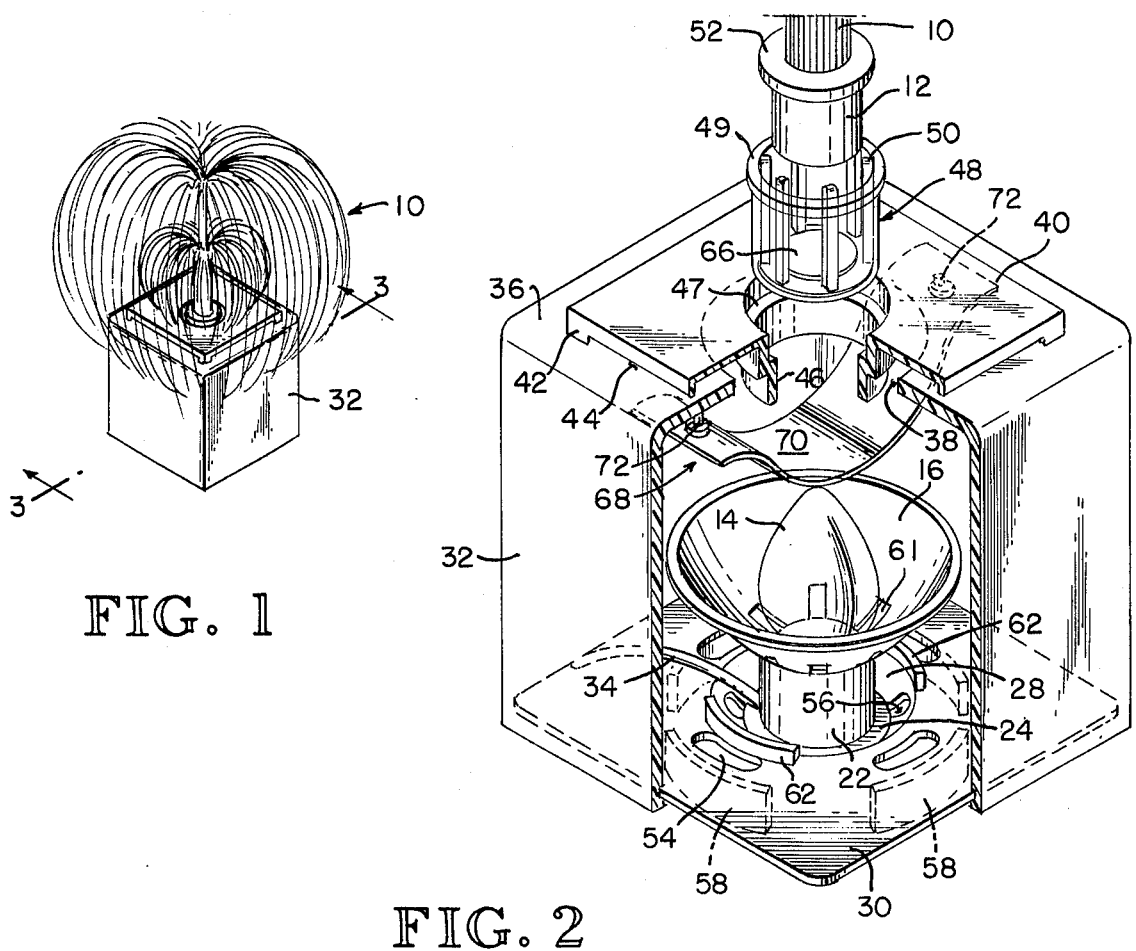
FIG. 2
FIG. 4
FIG. 3
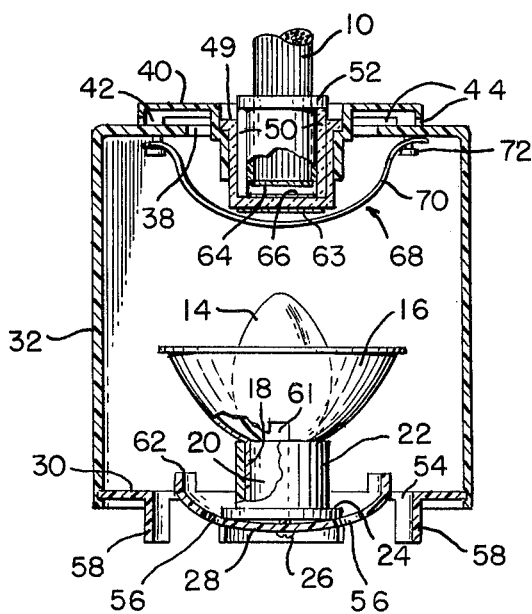

OPTIC FIBER DECORATIVE DEVICE

BACKGROUND OF THE INVENTION

1. Field of the Invention

The present invention relates to optic fiber decorative devices and, particularly, to such a device in which a spray of optic fibers is detachably mounted on a light housing to provide, for example, a form of table lamp.

2. Desciption of the Prior Art

Optic fibers are well known in the decorative arts for transmitting light over flexible paths. Such fibers may be made of coated glass, but for decorative devices are more commonly constructed from finely drawn, thermoplastic, organic polymer materials. In the latter instance, a core of a first thermoplastic is jacketed with a second thermoplastic having an index of refraction less than the first. Examples of such suitable materials and method for producing the optic fibers therefrom are disclosed in U.S. Pat. Nos. 3,472,921 and 3,742,107.

When the optic fibers are formed from thermoplastic materials, the light-receiving ends of the fibers must be protected from the transmission of excessive heat from the light source to prevent softening of the optic fiber material. This problem is experienced when a bunch of optica fibers are used in a lamp-type decorative product, such as shown in U.S. Pat. Nos. 3,431,410; 3,532,874 and 3,766,374.

SUMMARY OF THE INVENTION

The present invention aims to provide an improved decorative product of the type having a bunch of optic fibers with their light-receiving ends held together as a unit and their light-emitting end portions flared outwardly and, more particularly, aims to provide a venting and shielding system for use when the optic fibers are formed of a thermoplastic material which will prevent the light-receiving ends of the optic fibers from overheating.

A further object is to provide an improved decorative product using optic fibers in which the light source is housed and vented in a manner preventing undue heat on the optic fibers and in which light is not emitted from the housing such as to detract from the decorative lighting effect of the optic fibers.

Still another object is to provide a heat shielding system for thermoplastic optic fibers which permits various colors to be emitted.

In accordance with the present invention, a bunch of optic fibers have their light-receiving ends grouped as a unit and preferably held in a sleeve which fits into a socket in such a manner that the socket is internally vented. The socket, in turn, fits into the top of a housing containing an electric light bulb having a reflector directing the light toward the base of the socket. Venting is provided at the top and bottom of the housing in such a manner that a minimum amount of light is visible emitting from the housing. Polyester film is placed at multiple points in the light path between the bulb and the light-receiving ends of the logic fibers to shield them from heat.

BRIEF DESCIPTION OF THE DRAWINGS

In the accompanying drawings,

FIG. 1 is a perspective view of a decorative lamp embodying the present invention.

FIG. 2 is a detailed perspective view, with parts broken away and partly exploded.

FIG. 3 is a vertical sectional view taken as indicated by the line 3—3 of FIG. 1.

FIG. 4 is a top plan view of the socket which holds the sleeve surrounding the light-receiving ends of the optic fibers.

DETAILED DESCRIPTION OF THE PREFERRED EMBODIMENTS

Referring to the drawings, it is seen that a spray of optic fibers 10 is gathered in a bundle within a sleeve 12 with the bundled base ends exposed to receive light from an electric bulb 14 so as to emit light at their tip ends. The light from the bulb 14 is focused on the base ends of the fibers 10 by a reflector 16 having a polished inside reflecting face and a base neck 18 fitting between a dielectric bulb socket assembly 20 and a cylindrical holder 22 formed with a base flange 24. A pair of screws 26 anchor the flange 24 within a dish 28 formed integrally with a base plate 30 having a snap fit within the open lower end of a box housing 32. An electric cord 34 extends into the housing through a notch at the edge of the plate 30 and passes through a notch in the holder 22 into the socket assembly 20 to terminal contacts for the bulb 14.

The housing 32 has an integral top wall 36 with a central opening 38. Surmounting this top wall 36 is a flat cover 40 having corner legs 42 fixed to the wall to provide upper ventilating slots 44 communicating with the peripheral portion of the opening 38 via a gap between the cover 40 and the upper face of the wall 36. At its center, the cover 40 has a cylindrical stepped boss 46 depending into the housing 32 in spaced relation to the periphery of the opening 38 and providing an annular seat 47 for the rim flange 49 of a holder or cup 48. This cup is transparent, at least the base thereof, and receives the sleeve 12. It will be noted that the cup 48 has a plurality of circumferentially spaced internal ribs 50 which project longitudinally above the rim of the cup to be engaged at the top by an annular upper lip 52 on the sleeve 12 so as to space the bottom of the sleeve from the base of the cup 48 and permit air to circulate from outside the cup beneath the sleeve 12 via the spaces between the ribs 50.

Ventilating through the base of the housing is provided by four arcuate slots 54 in the base plate 30 and four holes 56 in the dish 28 adjacent the holder 22. Legs 58 depend from the base plate at the outside of the ventilating slots 54 to space the slots and holes 56 above the supporting surface on which the unit is placed so that air is free to circulate beneath the base plate and between the legs and then pass upwardly into the housing through the slots 54 and holes 56. Complementing the latter are a plurality of ventilating openings 61 provided in the reflector 16 near the base of the bulb 14. Baffles 62 assist in properly directing the upward airflow.

It will be noted tht the top wall 36 of the housing 32 extends far enough beneath the cover 40 as to function as a light baffle so that there will not be a distracting amount of light emitting through the vents 44. Similarly, the location of the bottom legs 58 is such, relative to the vents 54 and 56, as to also serve as a light baffle respecting light emitting from the bottom of the housing.

As an important part of the invention, there are provided heat-shielding discs 66 and 63 at the top and bottom faces of the base of the cup 48 and a heat-shielding disc 64 covering the light-receiving ends of the optic fibers 10, as best seen in FIG. 3. A further heat shield 68 is provided by a strip 70 having openings near its ends which are snap fitted over pins 72 depending from the upper wall 36. The foregoing heat shields are formed of a suitable polyester film which filters out a significant amount of the infrared radiation emitting from the bulb 14. A suitable polyester for the heat shielding is polyethylene terephthalate, commercially available as "Mylar No. 1000-S," produced by E. I. du Pont de Nemours & Co., Inc.

As a consequence of the heat shields 63, 64 and 68, the ventilation in the cup 48 between the ribs 50 and beneath the disc 64, and the ventilation up through the housing by way of the bottom slots 54 and top slots 44, the bunched light-receiving ends of the spray of optic fibers 10 are kept cool enough to prevent softening thereof.

The disc 64, or a removable color disc resting thereon, may be given the desired color of the light to be emitted from the free ends of the optic fibers 10, or the lower end of the bunched fibers may be painted with a colored resin. If desired, two or more colors can be provided by dividing the disc 64 or circular bunched ends of the optic fibers into segments, sectors or bands with different colors or alternated colors. Also, as an alternative, a color wheel (not shown) can be inserted above the bulb 14 which is powered by an electric motor or by a pyromagnetic motor running on heat from the bulb.

It is believed that the manner of assembly and operation of the decorative device of the present invention are apparent from the above description, together with reference to the drawing.

The box housing 32, cover 40, and base plate 30 may be formed independently from a suitable plastic material and then assembled by bonding the bottom of the legs 42 to the upper wall 36 and snap fitting the periphery of the base plate into a suitable inside groove formed near the bottom of the sidewalls of the box housing. Prior to such mounting of the base plate, the heat shield 68 is fitted onto the pins 72; and the socket holder 22, with the reflector 16 and socket 20 in place, is mounted onto the base plate by the screws 26 and the bulb 14 is screwed into the socket. At the top of the assembly, after the heat-shielding discs 63, 64 and 66 have been bonded in position and the sleeve 12 placed over the bunched ends of the optic fiber spray, the sleeve is fitted into the cup 48 and the latter is in turn lowered into the stepped boss 46 until the rim flange 49 engages the annular seat 47.

Since the spray of optic fibers is merely plugged into operative position, it will be apparent that a choice of sprays of various sizes or shapes may be provided for use without modification of the holder assembly, and that the emitted color or colors may also be easily changed from time to time.

The embodiments of the invention in which a particular property or priviledge is claimed are defined as follows:

1. A decorative device comprising,
   a housing having a top and a bottom,
   a socket at the top of the housing having a side wall and a transparent base,
   a light source in the housing directed at the base of the socket,
   a spray of optic fibers having lower ends, said lower ends being gathered in a bunch and depending into said socket,
   a sleeve over said bunch,
   means spacing said sleeve from the base and side wall of said socket to form ventilation channels for air circulation,
   transparent shield means at the lower end of said bunch for shielding said optic fibers from heat generated by said light source, and
   vents in the bottom and top of the housing arranged to vent heat generated by the light source from the housing, at least one of said vents being in communication with said ventilation channels to provide flow-through ventilation whereby air flows between said vent and ventilation channels, passing through the interior of said housing therebetween.

2. A decorative device according to claim 1 in which said light source comprises a reflector focusing at the lower end of said bunch and an electric light bulb surrounding by said reflector, said reflector having vent openings therethrough adjacent said bulb.

3. A decorative device according to claim 1 wherein said transparent shield means comprises a strip of flexible, light-transmissive, heat-reflecting material having ends fastened to the inside surfaces of the housing top and a midsection curving downwardly beneath said socket, said shield means having a transverse dimension less than the transverse dimension of said housing such that air may flow from one side of said shield to the other to allow flow-through ventilation.

4. A decorative device according to claim 1 wherein said transparent shield means comprise a layer of light-transmissive, heat-reflective material coating the surfaces of the base of said socket.

5. A device according to claim 1 in which the top of said housing is stepped thereby forming upper and lower steps with the top vents located between said upper and lower steps, the wall of the lower step extending inwardly beneath the upper step to serve as a light baffle spaced outwardly from said socket, said socket depending from the upper step.

6. A device according to claim 1 further including a plurality of spaced apart legs extending downwardly from the bottom of the housing outwardly of and adjacent the vents in said bottom, said legs resting on a horizontal surface such that said horizontal surface forms a light baffle whereby light passing through said vents is shielded by said horizontal surface.

7. A device according to claim 1 in which the bottom of the housing has a central downwardly dished portion in which said light source is mounted and which contains the bottom vents.

8. A decorative device according to claim 1 in which said transparent shield means comprises a film of polyethylene terephthalate.

9. A decorative device comprising,
   a housing having a bottom and a top with a housing aperture extending therethrough,
   a baffle plate spaced above the top of said housing and covering said housing aperture, said baffle plate having a hollow cylindrical holder extending through said housing aperature into said housing, said holder having an outer diameter less than the diameter of said housing aperature thereby forming a venting slot between said holder and the top of said housing,
   and electric light source in the housing directed at the holder,
   a spray of optic fibers having lower ends, said lower ends being gathered in a bunch within said holder, and
   a vent in the bottom of said housing to provide flow-through ventilation whereby air flows into the vents in said bottom, through said housing, through said venting slot and out between said baffle plate and the top of said housing.

* * * * *